United States Patent [19]

Suzuoki et al.

[11] Patent Number: 5,757,376
[45] Date of Patent: May 26, 1998

[54] METHOD OF PRODUCING IMAGE DATA AND ASSOCIATED RECORDING MEDIUM

[75] Inventors: Masakazu Suzuoki, Tokyo; Makoto Furuhashi, Kanagawa; Masayoshi Tanaka, Kanagawa; Teiji Yutaka, Kanagawa, all of Japan

[73] Assignee: Sony Corporation, Tokyo, Japan

[21] Appl. No.: 565,723

[22] Filed: Nov. 30, 1995

[30] Foreign Application Priority Data

Dec. 2, 1994 [JP] Japan .................... 6-300021

[51] Int. Cl.$^6$ .................................... G06T 17/00
[52] U.S. Cl. .................................... 345/431
[58] Field of Search .................... 395/131, 129, 395/130, 132; 345/431, 429, 430, 432

[56] References Cited

U.S. PATENT DOCUMENTS

| | | | |
|---|---|---|---|
| 4,811,124 | 3/1989 | Dujari | 369/59 X |
| 5,224,208 | 6/1993 | Miller, Jr. et al. | 395/125 |
| 5,285,275 | 2/1994 | Abe | 348/384 |
| 5,291,468 | 3/1994 | Carmon | 369/48 X |
| 5,307,450 | 4/1994 | Grossman | 395/123 |
| 5,471,450 | 11/1995 | Yonemitsu | 369/60 |
| 5,491,677 | 2/1996 | Sasaki | 369/60 |
| 5,553,208 | 9/1996 | Murata et al. | 395/125 |
| 5,561,746 | 10/1996 | Murata et al. | 395/119 |

FOREIGN PATENT DOCUMENTS

| | | |
|---|---|---|
| A-0 210 423 | 4/1987 | European Pat. Off. . |
| A-0 522 853 | 1/1993 | European Pat. Off. . |
| A-0 590 881 | 4/1994 | European Pat. Off. . |
| A-2-195-519 | 7/1988 | United Kingdom . |
| 2-231-245 | 7/1990 | United Kingdom . |
| A-2272137 | 4/1994 | United Kingdom . |
| WO 84/02027 | 5/1984 | WIPO . |

OTHER PUBLICATIONS

Computer Technology Review, Special Summer Issue, 11 (1991) Jul., No. 9, Integrating Image Processing With Standard Workstation Platforms by David Pfeiffer, pp. 103, 104, 106 & 107.

IEEE Computer Graphics and Application, 11 (1991) Mar., No. 2, Graphics Workstations: A European Perspective by Ken Robbins, Mark Martin, Max Mehl, Allan Davison, Kieron Drake and Mel Slater, pp. 91–103.

SMPTE Journal, vol. 100, No. 3, Mar. 1991, US, pp. 162–166, XP000178490, Vigneaux, et al.: "A Real–Time Video Mapping and Manipulating System".

Computer Graphics Principles and Practice, 2d, 1990, Addison–Wesley, Foley, et al., pp. 741–744.

Eurographics, 4–8 Sep. 1989, Amsterdam, pp. 257–268, SP000132231, Bennis and Gagalowicz: "Hierarchical Texture Synthesis on 3–D Surfaces".

*Primary Examiner*—Phu K. Nguyen
*Assistant Examiner*—Cliff N. Vo
*Attorney, Agent, or Firm*—Fulwider Patton Lee & Utecht, LLP

[57] ABSTRACT

A data format is provided capable of assigning a desired color lookup table (CLUT) to a texture pattern of each polygon drawn on a two-dimensional display screen. Assuming that TPF represents a pixel depth of the texture pattern, when TPF is 00, 01, and 10, the format (CLUT) is applied of a 4-bit mode, an 8-bit mode, and 16-bit mode respectively, whereby its related command is decreased in word length and thus requires less storage in a source video memory.

13 Claims, 32 Drawing Sheets

| ID | R | G | B |
|----|---|---|---|
| Y0 | | X0 | |
| Y1 | | X1 | |
| Y2 | | X2 | |

| ID | OFY | OFX |
|----|-----|-----|

| SIZE | ADDR | | |
|---|---|---|---|
| ID | R | G | B |
| Y0 | | X0 | |
| Y1 | | X1 | |
| Y2 | | X2 | |
FIG.11
| 01 | ADDR | |
|---|---|---|
| ID | OFY | OFX |
FIG.12
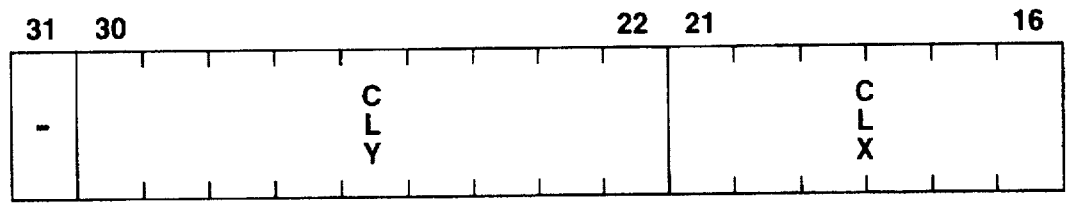
FIG.13
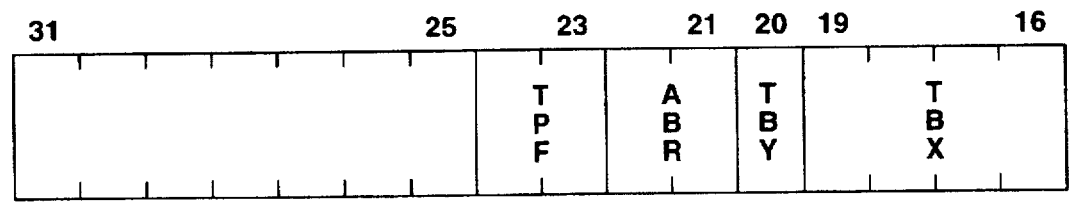
FIG.14

FIG.16A (IIP=1,TME=1,CNT=0)

| 31 | 23 | 15 | 7 0 |
|---|---|---|---|
| CODE | R0 | G0 | B0 |
| Y0 | | X0 | |
| CBA | | V0 | U0 |
| | R1 | G1 | B1 |
| Y1 | | X1 | |
| TSB | | V1 | U1 |
| | R2 | G2 | B2 |
| Y2 | | X2 | |
| | | V2 | U2 |

FIG.16B (IIP=1,TME=1,CNT=0)

| 31 | 23 | 15 | 7 0 |
|---|---|---|---|
| CODE | R0 | G0 | B0 |
| Y0 | | X0 | |
| CBA | | V0 | U0 |
| | R1 | G1 | B1 |
| Y1 | | X1 | |
| TSB | | V1 | U1 |
| | R2 | G2 | B2 |
| Y2 | | X2 | |
| | | V2 | U2 |
| | R3 | G3 | B3 |
| Y3 | | X3 | |
| | | V3 | U3 |

FIG.16C (IIP=1,TME=0,CNT=0)

| 31 | 23 | 15 | 7 0 |
|---|---|---|---|
| CODE | R0 | G0 | B0 |
| Y0 | | X0 | |
| | R1 | G1 | B1 |
| Y1 | | X1 | |
| | R2 | G2 | B2 |
| Y2 | | X2 | |

FIG.16D (IIP=1,TME=0,CNT=1)

| 31 | 23 | 15 | 7 0 |
|---|---|---|---|
| CODE | R0 | G0 | B0 |
| Y0 | | X0 | |
| | R1 | G1 | B1 |
| Y1 | | X1 | |
| | R2 | G2 | B2 |
| Y2 | | X2 | |
| | R3 | G3 | B3 |
| Y3 | | X3 | |

FIG.16E (IIP=0,TME=1,CNT=0)

| 31 | 23 | 15 | 7 0 |
|---|---|---|---|
| CODE | R | G | B |
| Y0 | | X0 | |
| CBA | | V0 | U0 |
| Y1 | | X1 | |
| TSB | | V1 | U1 |
| Y2 | | X2 | |
| | | V2 | U2 |

FIG.16F (IIP=0,TME=1,CNT=1)

| 31 | 23 | 15 | 7 0 |
|---|---|---|---|
| CODE | R | G | B |
| Y0 | | X0 | |
| CBA | | V0 | U0 |
| Y1 | | X1 | |
| TSB | | V1 | U1 |
| Y2 | | X2 | |
| | | V2 | U2 |
| Y3 | | X3 | |
| | | V3 | U3 |

FIG.16G (IIP=0,TME=0,CNT=0)

| 31 | 23 | 15 | 7 0 |
|---|---|---|---|
| CODE | R | G | B |
| Y0 | | X0 | |
| Y1 | | X1 | |
| Y2 | | X2 | |

FIG.16H (IIP=0,TME=0,CNT=1)

| 31 | 23 | 15 | 7 0 |
|---|---|---|---|
| CODE | R | G | B |
| Y0 | | X0 | |
| Y1 | | X1 | |
| Y2 | | X2 | |
| Y3 | | X3 | |

(IIP=1 CNT=0)

| 31 | 23 | 15 | 7 | 0 |
|---|---|---|---|---|
| CODE | R0 | G0 | B0 | |
| Y0 | | X0 | | |
| | R1 | G1 | B1 | |
| Y1 | | X1 | | |

FIG.19A

(IIP=0 CNT=0)

| 31 | 23 | 15 | 7 | 0 |
|---|---|---|---|---|
| CODE | R | G | B | |
| Y0 | | X0 | | |
| Y1 | | X1 | | |

FIG.19B

(IIP=1 CNT=1)

| 31 | 23 | 15 | 7 | 0 |
|---|---|---|---|---|
| CODE | R0 | G0 | B0 | |
| Y0 | | X0 | | |
| ⋮ | | | | |
| | Rn | Gn | Bn | |
| Yn | | Xn | | |
| TERMINATION CODE | | | | |

FIG.19C

(IIP=0 CNT=0)

| 31 | 23 | 15 | 7 | 0 |
|---|---|---|---|---|
| CODE | R | G | B | |
| Y0 | | X0 | | |
| ⋮ | | | | |
| Yn | | Xn | | |
| TERMINATION CODE | | | | |

FIG.19D

(TME=1 SIZ=00)

| 31 | 23 | 15 | 7 | 0 |
|---|---|---|---|---|
| CODE | R | G | B | |
| Y0 | | X0 | | |
| CBA | | V0 | U0 | |
| H | | W | | |

FIG.21A

(TME=0 SIZ=00)

| 31 | 23 | 15 | 7 | 0 |
|---|---|---|---|---|
| CODE | R | G | B | |
| Y0 | | X0 | | |
| H | | W | | |

FIG.21B

(TME=1 SIZ!=00)

| 31 | 23 | 15 | 7 | 0 |
|---|---|---|---|---|
| CODE | R | G | B | |
| Y0 | | X0 | | |
| CBA | | V0 | U0 | |

FIG.21C

(TME=0 SIZ!=00)

| 31 | 23 | 15 | 7 | 0 |
|---|---|---|---|---|
| CODE | R | G | B | |
| Y0 | | X0 | | |

FIG.21D

| 31 | 23 | 15 | 7 | 0 |
|---|---|---|---|---|
| CODE ||||
| SY || SX ||
| DY || DX ||
| H || W ||

FIG.23

| 31 | 23 | 15 | 7 | 0 |
|---|---|---|---|---|
| CODE ||||
| DY || DX ||
| DATA 1 || DATA 0 ||
| H || W ||
| ⋮ || ⋮ ||
| DATA N-1 || DATA N-2 ||

FIG.25

| 31 | 23 | 15 | 7 | 0 |
|---|---|---|---|---|
| CODE ||||
| SY || SX ||
| H || W ||

FIG.27

| 31 | 23 | 15 | 7 | 0 |
|---|---|---|---|---|
| CODE | B | G | R | |
| Y0 | | X0 | | |
| H | | W | | |

FIG.38

METHOD OF PRODUCING IMAGE DATA AND ASSOCIATED RECORDING MEDIUM

This application claims priority under the International Convention based upon Japanese Patent Application No. P06-300021 filed Dec. 2, 1994.

BACKGROUND OF THE INVENTION

The present invention relates generally to image data processing and, more particularly, to improvements in methods of producing enhanced image data by data processing and to a recording medium carrying such image data.

It is common practice in the prior art that images produced on a television receiver, a monitor or a CRT display of a home video-game machine, a microcomputer, or a graphic computer are substantially two-dimensional. Such images are usually animated by moving and varying a two-dimensional character or object on a planar two-dimensional background. However, such two-dimensional images or pictures are limited in both the modeling of a background and the movement of character objects, thus failing to yield more realistic images, particularly in a video game.

For improvement, various methods of making highly realistic three-dimensional images or pictures have been proposed and some of them are described below. One of various predetermined movements of a character object viewed from several directions may be selected and displayed according to visual variation, such as a change in the viewpoint in the image. Also, a simulated three-dimensional image may be created by overlapping a plurality of two-dimensional graphics, one over the other, in a depthwise direction. A texture mapping method may also be provided in which the surfaces of a polygon are filled with a texture map (of material or pattern) to generate an image model. In another method, a variation of colors is produced by changing color data of the image with the use of a color lookup table.

In a typical example of a prior art home video-game machine, manipulation information is introduced from an input device, such as an entry pad or a joy stick, and is passed across an interface along a main bus by the action of a CPU consisting mainly of a microprocessor. Upon introduction of the manipulation data, three-dimensional data stored in a main memory is transmitted by the action of a video processor to a source video memory for temporary storage.

The aforementioned CPU also operates to transfer to the video processor a specific sequence for reading out a series of image data segments from the source video memory for overlapping them, one over the other, on the screen. According to the reading sequence of the image data segments, the video processor reads the image data segments from the source video memory and displays them in their overlapped arrangement.

While the image data segments are being read and displayed, audio components of the manipulation information are fed to an audio processor which, in turn, picks up corresponding audio data from an audio memory for synchronization with the image data.

For example, the source video memory may hold a background of a checker-board pattern and a group of rectangular image segments or sprites representing cross sections of a cylindrical object in the background. Other areas besides the cross sections of the cylindrical object on the sprites may be drawn in transparency.

A sync generator mounted in the video processor generates a read address signal in response to a sync signal of the image data. The read address signal of the sync generator is transmitted via the main bus to a read address table determined by the CPU. The sync generator also reads the image segments from the source video memory in response to a signal from the read address table.

The video data segments retrieved are then fed to an overlap processor where they are overlapped, one over the other, in the sequence determined by a priority table and passed via the main bus from the CPU. Since the background comes the first and is then followed by the rectangle sprites, the group of sprites being placed in superposition, one over the other, on the background.

Then, the other areas in addition to the cross sections of the cylindrical object of the aforementioned sprites, which are overlapped one over the other on the background, are rendered to transparency by a suitable transparency processor. As a result, the two-dimensional image data of the cylindrical object can be reproduced as three-dimensional data VD0 of the original image.

The CPU delivers various fundamental commands for color assignment using color lookup tables and texture mapping, application of a semitransparency process for providing a semitransparent state by mixing the pixel data (including R, G, and B color component data) of the current image being displayed with the pixel data of a succeeding image at a specific ratio of alpha, and application of a dithering process by switching on and off its action where the boundary between two colors is smoothed by noise. However, due to assignment of a range of textures and color lookup tables, the semitransparency process, and the dithering process, their commands should be increased in word length. Moreover, amounts of data to be stored in the source video memory will be increased accordingly.

For example, the semitransparency process is carried out in the transparency processor of the video processor by mixing the pixel data of the current image being displayed with the pixel data of a succeeding image at the alpha mixture ratio determined and supplied by the CPU. In a conventional manner of the semitransparency process, the alpha mixture ratio is carried in a drawing command and, thus, is stored in the source video memory for every pixel. If it is desired that the mixture ratio hold more setting details, the number of bits assigned to the ratio must be increased. Consequently, the prior art drawing command is substantially increased in data length and will occupy considerable storage area in the source video memory.

Accordingly, there has been a long existing need for enhanced image data processing having reduced word length and memory storage requirements. The present invention clearly fulfills these needs.

SUMMARY OF THE INVENTION

Briefly, and in general terms, the present invention provides an improved method of producing image data wherein commands are decreased in word length and their storage size in a source video memory is minimized. The invention also provides a recording medium carrying such enhanced image data.

More particularly, by way of example, and not necessarily by way of limitation, an image data producing method, in accordance with the present invention, is provided for producing a three-dimensional image data of a polygon shape which represents a segment of a three-dimensional image for the shape drawn on a two-dimensional display screen by two-dimensional image data converted from the three-dimensional image data, producing a color interpolation data for specifying a color interpolation process to specify a color in the polygon shape, and producing texture image data of a two-dimensional form which is attached to the polygon shape drawn on the two-dimensional display screen when the color in the polygon shape has been determined. In particular, the image data producing method of the present invention may be characterized by producing color specifying data for assigning a desired color data table to the texture image data for each polygon shape drawn on the two-dimensional display screen, by producing a mixture rate specifying data for determining for each polygon shape a mixture rate in a semitransparency process at which pixel data of the current polygon shape drawn on the two-dimensional display screen is mixed with pixel data of a succeeding polygon shape to be drawn, or by producing dithering specifying data for switching on and off a dithering action where each boundary between two colors is smoothed by noise for each polygon shape drawn on the two-dimensional display screen.

Further more, a recording medium according to the present invention is provided for carrying at least three-dimensional image data of a polygon shape which represents a segment of a three-dimensional image for the shape drawn on a two-dimensional display screen by two-dimensional image data converted from the three-dimensional image data, color interpolation data for specifying a color interpolation process to select a color in the polygon shape, and a texture image data of a two-dimensional form which is attached to the polygon shape drawn on the two-dimensional display screen when the color in the polygon shape has been determined.

The recording medium of the present invention may also be characterized by carrying in its storage color specifying data for assigning a desired color data table to the texture image data for each polygon shape drawn on the two-dimensional display screen, a mixture rate specifying data for determining for each polygon shape a mixture rate in a semitransparency process at which pixel data of the current polygon shape drawn on the two-dimensional display screen is mixed with pixel data of a succeeding polygon shape to be drawn, or a dithering specifying data for switching on and off a dithering action where each boundary between two colors is smoothed by noise for each polygon shape drawn on the two-dimensional display screen.

According to the present invention, the color specifying data for assigning a desired color data table to the texture image data for each polygon shape drawn on the two-dimensional display screen is produced, thus eliminating the limitation of the number of colors used in the application of pseudo-color texture.

In addition, the mixture rate specifying data determines for each polygon shape a mixture rate in the semitransparency process at which pixel data of the current polygon shape drawn on the two-dimensional display screen is mixed with pixel data of a succeeding polygon shape to be drawn. This eliminates the need for data which determines the mixture ratio for each pixel.

In accordance with the present invention, dithering specifying data may also be produced for switching on and off the dithering action where each boundary between two colors is smoothed by noise for each polygon shape drawn on the two-dimensional display screen, thus contributing to the freedom of graphic representation.

Hence, the present invention satisfies a long existing need for enhanced image data processing having reduced word length and memory storage requirements, as well as a recording medium carrying such image data.

These and other objects and advantages of the invention will become apparent from the following more detailed description, when taken in conjunction with the accompanying drawings of illustrative embodiments.

DESCRIPTION OF THE DRAWINGS

FIG. 11 is a diagram showing another command form of the drawing instruction;

FIG. 12 is a diagram showing assignment of coordinate offsets in the command form shown in FIG. 11;

FIG. 13 is a diagram showing the structure of a CBA;

FIG. 14 is a diagram showing the structure of a TSB;

FIGS. 16(A–H) are diagrams showing data assignments of the triangle drawing command;

FIGS. 19(A–D) are diagrams showing data assignments of the line drawing command;

FIGS. 21(A–D) are diagrams showing data assignments of the sprite drawing command;

FIG. 23 is a diagram showing data assignments of the local-to-local transfer command;

FIG. 25 is a diagram showing data assignments of the host-to-local transfer command;

FIG. 27 is a diagram showing data assignments of the local-to-host transfer command;

FIG. 38 is a diagram showing data assignment of the block write command;

DESCRIPTION OF THE PREFERRED EMBODIMENTS

Figure 1:
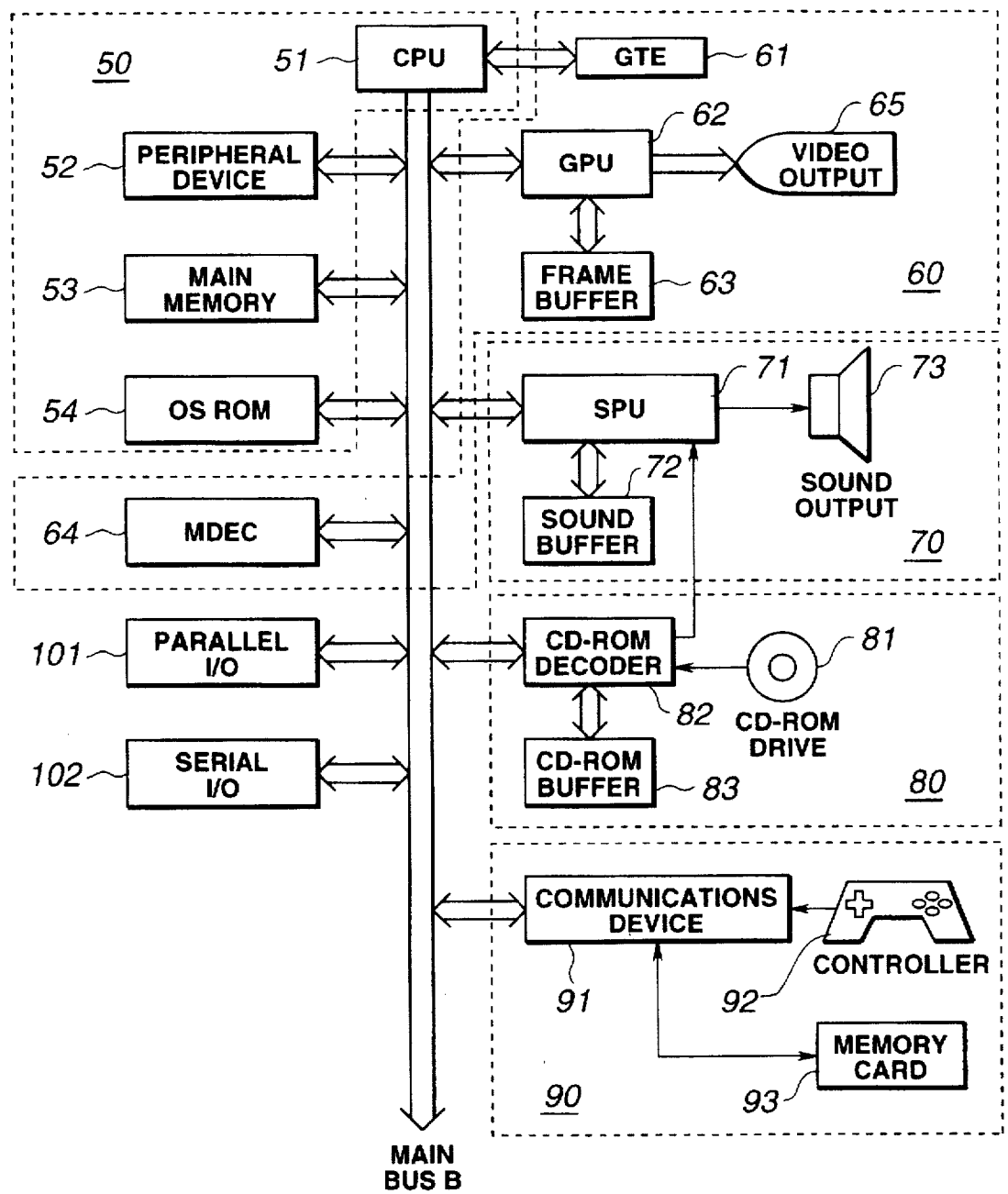
FIG. 1 is a block diagram of the overall system arrangement of an image data processing apparatus, in accordance with the present invention.

Referring now to the drawings, like reference numerals denote like or corresponding parts throughout the drawing figures.

Figure 43:
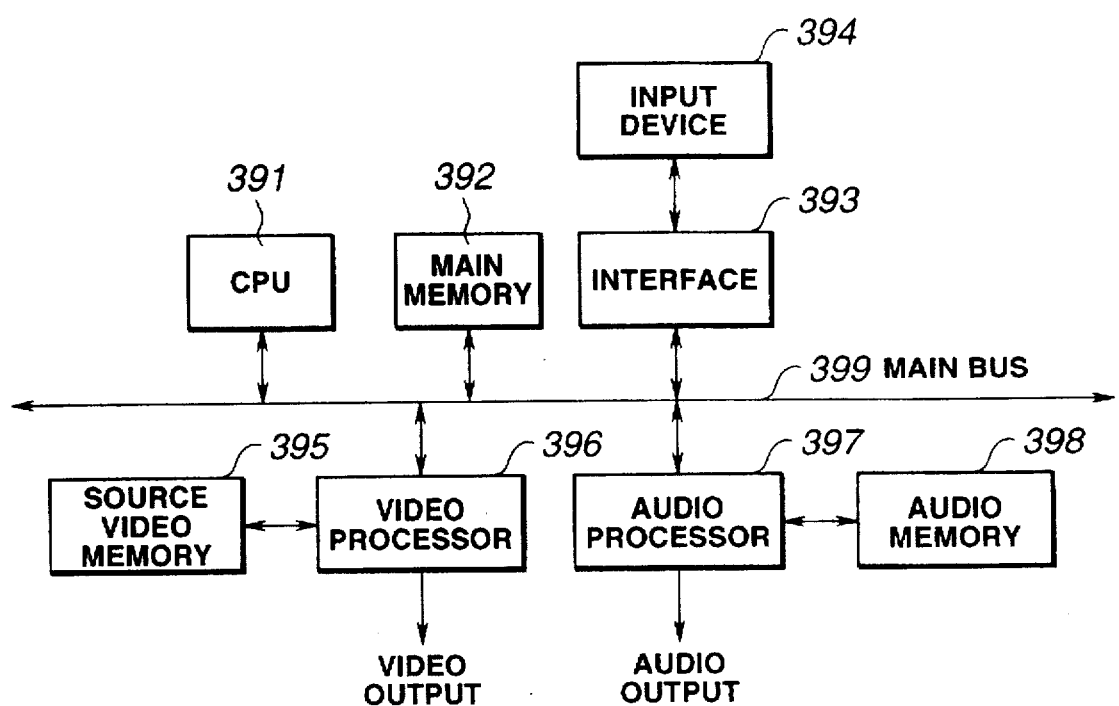
FIG. 43 is a block diagram illustrating a system arrangement of a prior art image producing apparatus or home video-game machine.

A typical example of a prior art home video-game machine is illustrated in FIG. 43. As shown in FIG. 43, manipulation information introduced from an input device 391 such as an entry pad or a joy stick is passed across an interface 393 and introduced along a main bus 399 by the action of a CPU 391 consisting mainly of a microprocessor. As previously indicated, upon introduction of the manipulation data, a three-dimensional data stored in a main memory 392 is transmitted by the action of a video processor 396 to a source video memory 395 for temporal storage.

The CPU 391 also operates to transfer to the video processor 396 a specific sequence for reading out a series of image data segments from the source video memory 395 for overlapping them one over the other in the screen. According to the sequence of reading the image data segments, the video processor 396 reads the image data segments from the source video memory 395 and displays them in their overlap arrangement.

While the image data segments are being read and displayed, audio components of the manipulation information are fed to an audio processor 397 which, in turn, picks up corresponding audio data from an audio memory 398 for synchronization with the image data.

Figure 44:
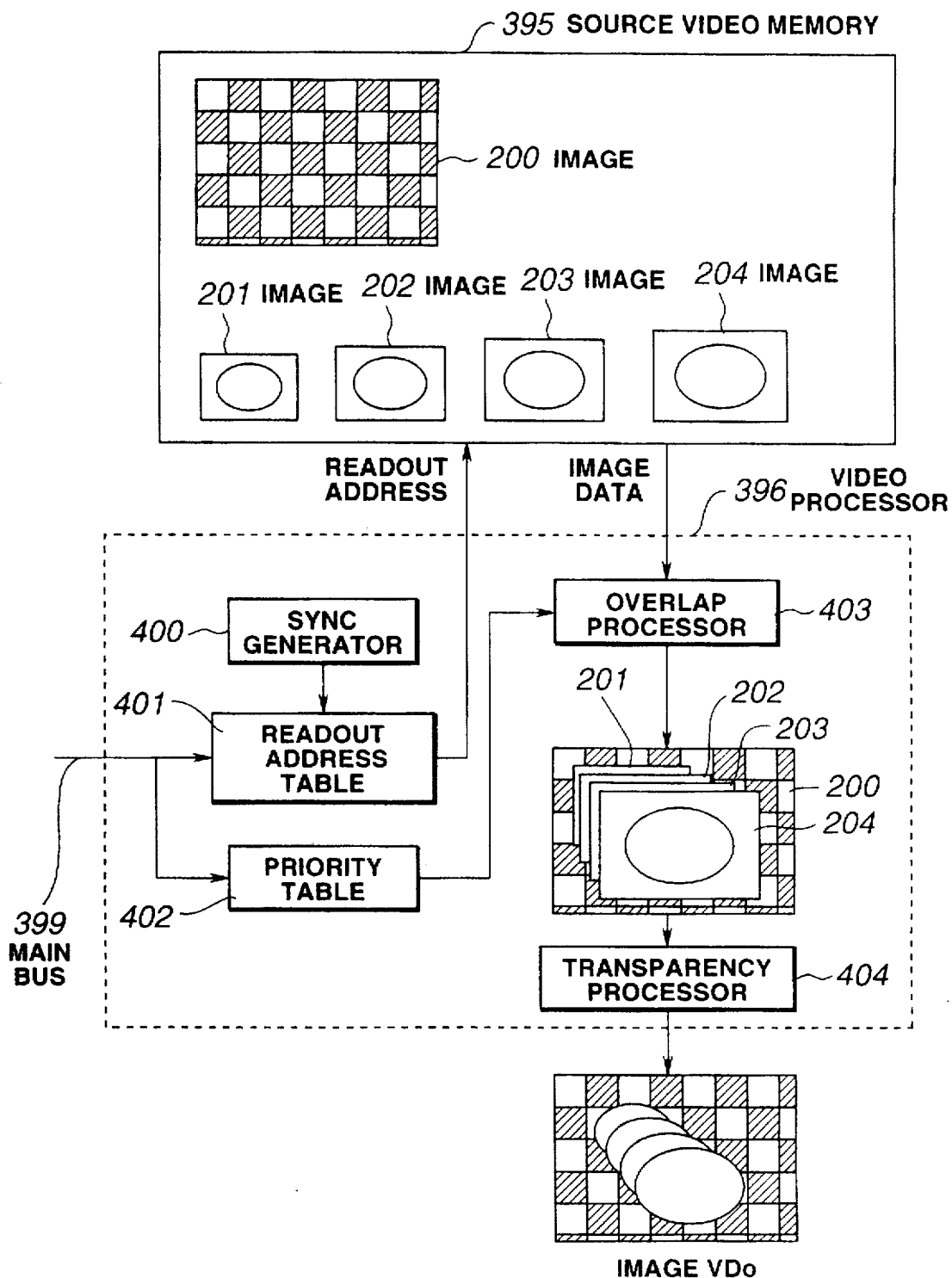
FIG. 44 is a combined block and schematic diagram illustrating an image data producing method as carried out by the prior art image producing apparatus.

As best observed in FIG. 44, there is shown a procedure of delivering a three-dimensional data on the basis of a two-dimensional data format in the home video-game machine illustrated in FIG. 43. FIG. 44 illustrates display of a cylindrical object on the background of a checker-board pattern in a three-dimensional image.

The source video memory 395 of FIG. 44 holds a background 200 of a checker-board pattern and a group of rectangle image segments or sprites 201, 202, 203, and 204 representing cross sections of the cylindrical object on the background 200. Other areas than the cross sections of the cylindrical object on the sprites 201, 202, 203, and 204 are drawn in transparency.

A sync generator 400 mounted in the video processor 396 is used to generate a read address signal in response to a sync signal of the image data. The read address signal of the sink generator 400 is transmitted via the main bus 399 to a read address table 401 determined by the CPU 391 shown in FIG. 43. The sync generator 400 also reads the image segments from the source video memory 395 in response to a signal from the read address table 401.

The video data segments retrieved are then fed to an overlap processor 403 where they are overlapped, one over the other, in the sequence determined by a priority table 402 and passed via the main bus 399 from the CPU 391. As the background 200 comes first, and is then followed by the rectangle sprites 201, 202, 203, and 204 in that order, the group of sprites are placed, one over the other, on the background 200.

Then, the other areas in addition to the cross sections of the cylindrical object of the sprites 201, 202, 203, and 204 which are overlapped, one over the other, on the background are rendered to transparency by a transparency processor 404.

As a result, the two-dimensional image data of the cylindrical object can be reproduced as three-dimensional data VD0 of the original image as shown in FIG. 44.

The CPU 391 delivers various fundamental commands for color assignment with the use of color lookup tables and texture mapping, application of a semitransparency process for providing a semitransparency state by mixing a pixel data (including R, G, and B color component data) of the current image being displayed with a pixel data of a succeeding image at a specific ratio of alpha, and application of a dithering process by switching on and off its action where the boundary between two colors is smoothed by noise. However, due to assignment of a range of the textures and color lookup tables, the semitransparency process, and the dithering process, their commands should be increased in word length. Moreover, amounts of data to be stored in the source video memory 395 will be increased correspondingly. For example, the semitransparency process is carried out in the transparency processor 404 of the video processor 396 by mixing the pixel data of the current image being displayed where with the pixel data of a succeeding image at the alpha mixture ratio determined and supplied by the CPU 391. In a conventional manner of the semitransparency process, the alpha mixture ratio is carried in a drawing command and is, thus, stored in the source video memory 395 for every pixel. If it is desired that the mixture ratio hold more setting details, the number of bits assigned to the ratio has to be increased. As the result, the prior art drawing command must be increased in data length and will, therefore, occupy a considerable storage area in the source video memory 395.

Prior to the description of a primary embodiment of the present invention in the form of a method of producing image data, an image processing system of another embodiment of the present invention for generating a three-dimensional graphic data from the image data produced by the image data processing method of the present invention will be explained to enhance the subsequent understanding of the primary embodiment.

Referring now to the drawings, FIG. 1 shows an arrangement of the image processing system installed in a home video-game machine. The image processing system is substantially designed for use in a home video-game machine, a microcomputer, or a graphic computer apparatus device.

The image processing system of the embodiment of FIG. 1 allows an operator to play a game by controlling relevant data (e.g., game programs) retrieved from a recording medium such as an optical disk (e.g., a CD-ROM) which is also designed by the present invention for storage of the data in a specific format.

More specifically, the image processing system of the embodiment shown in FIG. 1 comprises a main controller module 50 composed of a central processing unit (CPU) 51 and its peripheral devices (including a peripheral device controller 52), a graphic module 60 composed substantially of a graphic processing unit (GPU) 62 for drawing an image on a frame buffer 63, a sound module 70 composed of a sound processing unit (SPU) 71 and other devices for emitting a music or effect sound, an optical disk controller module 80 for controlling an optical (CD-ROM) disk drive 81 which acts as an auxiliary memory means and decoding of reproduced data, a communications controller module 90 for controlling entry of command signals from a controller 92, input and output of information on game parameter setting on a sub memory (or a memory card) 93, and a main bus B connected from the main control module 50 to the communications controller module 90.

The main controller module 50 comprises the CPU 51, the peripheral device controller 52 for controlling interrupt actions, time sequences, memory actions, and transmission of a direct memory access (DMA) signal, a main memory 53 composed of, e.g., 2-megabytes of RAM, and a ROM 54 of, for example, 512 kilobytes, in which programs, including an operating system for operating the main memory 53, graphic module 60, and sound module 70, are stored.

The CPU 51 may be a 32-bit reduced instruction set computer (RISC) for performing the operating system stored in the ROM 54 to control the entire system. The CPU 51 also includes a command cache and a scratch pad memory for controlling real storage.

The graphic module 60 comprises a GTE 61 consisting of a coprocessor for coordinate calculation to perform a coordinate transform process, the GPU 62 for drawing an image in response to command signals from the CPU 51, the frame buffer 63 has, e.g., one megabyte for storage of graphic data provided by the GPU 62, and an image decoder 64 (referred to as "MDEC" hereinafter) for decoding a coded image data compressed and encoded by an orthogonal transform process such as discrete cosine transforming.

The GTE 61 may have a parallel processor for performing a plurality of arithmetic operations in parallel and acts as a coprocessor for the CPU 51 to operate high-speed actions for coordinate transforming and calculation of light source, vector, and matrix of fixed decimal point notation.

More specifically, the GTE 61 is capable of performing the coordinate calculation of polygons at typically 1.5 million per second for flat shading where each triangle polygon is drawn in one single color. This allows the image processing system to minimize the load to the CPU 51 and thus perform the coordinate calculations at a higher speed.

The GPU 62 is responsive to a polygon drawing command from the CPU 51 for drawing a polygon or graphic to the frame buffer 63. The GPU 62 can draw up to 360,000 polygons per second and also, has a two-dimensional address space independently of the CPU 51 for mapping of the frame buffer 63.

The frame buffer 63 comprises a so-called dual port RAM which performs at the same time a retrieving of drawing data from the GPU 62 or a transfer of data from the main memory 53 and a releasing of data for display.

Also, the frame buffer 63 may have a size of one megabyte constituting a pixel matrix of 1024 in horizontal by 512 in vertical in 16-bit format. Any desired area in the size of the frame buffer 63 can be delivered to a video output means 65 such as a display.

In addition to the area delivered as a video output, the frame buffer 63 includes a color lookup table (referred to as "CLUT" hereinafter) area for storage of a CLUT which is used as a reference during drawing of graphics or polygons with the action of the GPU 62 and a texture area for storage of texture data to be coordinate transformed and mapped on the graphics or polygons drawn by the GPU 62. Both the CLUT and texture areas can be varied dynamically depending on a change of the display area. The frame buffer 63 can thus execute a drawing access to the area on display and a high-speed DMA transfer to and from the main memory 53.

The GPU 62 can also perform, in addition to the flat shading, Gouraud shading in which the color of a polygon is determined by interpolation of vertex color, and texture mapping in which a texture selected from the texture area is attached to a polygon.

For the Gouraud shading or texture mapping, the GTE 61 can perform the coordinate calculation at a rate of up to 500,000 polygons per second.

The MDEC 64 is responsive to a command signal from the CPU 51 for decoding a still or motion image data retrieved from a CD-ROM disk and stored in the main memory 53 and subsequently storing it again in the main memory 53. More particularly, the MDEC 64 performs a reverse discrete cosine transforming operation (referred to as reverse DCT) at a high speed for expanding compressed data of the color still image compression standard (known as JPEG) or the motion image encoding standard for storage media (known as MPEG, but for intraframe compression in this embodiment).

The image data reproduced is transferred via the GPU 62 to the frame buffer 63 and can therefore be used as a background for an image drawn by the GPU 62.

The sound module 70 comprises the sound processor unit (SPU) 71 responsive to a command from the CPU 51 for generating a music or effect sound, a sound buffer 72 having, by way of example and not necessarily by way of limitation, 512 kilobytes for storage of audio data of voice or music sound, sound source data retrieved from a CD-ROM, and a loud speaker 73 acting as a sound output means for emitting a music or effect sound generated with the SPU 71.

The SPU 71 has an adaptive differential pulse code modulation (ADPCM) signal decoding function for reproducing an audio data of 4-bit ADPCM format converted from a 16-bit audio data, a playback function for reproducing the sound source data stored in the sound buffer 72 to emit a music or effect sound, and a modulating function for modulating the audio data stored in the sound buffer 72 for playback. More specifically, the SPU 71 has an ADPCM sound source with 24-voices in which motion parameters of looping and time coefficients are automatically modified and which is actuated by a signal from the CPU 51. The SPU 71 controls its address space mapped with the sound buffer 72 and can perform the reproduction of audio data by direct transmission of ADPCM data with information of key-on/key-off or modulation from the CPU 51 to the sound buffer 72.

Accordingly, the sound module 70 is used as a sampling sound source for generating a music or effect sound corresponding to the audio data stored in the sound buffer 72 upon receiving a command signal from the CPU 51.

The optical disk controller module 80 comprises the disk drive 81 for retrieving a program or data from an optical disk of CD-ROM, a decoder 82 for decoding an encoded, stored program or data accompanied with error correction codes (ECC), and a buffer 83 of, for example, 32 kilobytes for storage of data retrieved from an optical disk. The optical disk controller module 80 composed of the disk drive 81, decoder 82, and other components for reading data from a disk is also arranged to support other disk formats including CD-DA and CD-ROM XA. The decoder 82 also serves as a member of the sound module 70.

The audio data retrieved by the disk drive 81 from the disk is not limited to the ADPCM format (for storage on CD-ROM XA disks) but may be of a common PCM mode produced by analog-to-digital conversion.

The ADPCM data may be recorded in 4-bit differential form calculated from 16-bit digital data and is first subjected to error correction and decoding in the decoder 82, transmitted to the SPU 71 where it is D/A converted, and supplied to the loud speaker 73 for playback.

The PCM data may be recorded in 16-bit digital signal form and is decoded by the decoder 82 for driving the loud speaker 73. An audio output of the decoder 82 is first sent to the SPU 71 where it is mixed with an SPU output and released through a reverberation unit for audio playback.

The communications controller module 90 comprises a communications controller device 91 for controlling communications along the main bus B with the CPU 51, the controller 92 for entry of commands by an operator, and the memory card 93 for storage of game setting data.

The controller 92 is an interface for transmitting instructions of the operator to application software and may carry 16 command keys for entry of the instructions. Commands attributed to the keys as predetermined by the communications controller device 91 are fed to the communications controller device 91 in synchronous mode at a speed of 60 times per second. The communications controller device 91 then transmits the key commands to the CPU 51. The controller 92 has two connectors arranged thereon for connection of a number of the controllers one after another through multi-tap ports.

Accordingly, upon receiving the command from the operator, the CPU 51 starts performing a corresponding process action determined by a game program.

When the initial setting on a game to be played is requested, the CPU 51 transfers relevant data to the communications controller device 91 which, in turn, stores the data in the memory card 93.

The memory card 93 is separated from the main bus B and can freely be installed or removed while the main bus B is being energized. This will allow data of the game setting to be stored in two or more of the memory cards 93.

The system of this embodiment of the present invention is also provided with a 16-bit parallel input and output (I/O) port 101 and an asynchronous serial input and output (I/O) port 102. The system can be connected at the parallel I/O port 101 to any other peripheral device and at the serial I/O port 102 to another video game machine for communications.

Between the main memory 53, the GPU 62, the MDEC 64, and the decoder 82, it is required to transfer at a high speed huge amounts of the image data for reading a program, displaying a text, or drawing a graphic. The image processing system of this embodiment is thus adapted for allowing direct data transfer or DMA transfer between the main memory 53, the GPU 62, the MDEC 64, and the decoder 82 without using the CPU 51. Rather, it is under the control of the peripheral device controller 52. As a result, the load to the CPU 51 during the data transfer will be considerably reduced, thus ensuring high-speed data transfer operations.

The video game machine of the present invention allows the CPU 51 to execute the operating system stored in the RAM 54 upon being energized. As the operating system is executed, the actions of the graphic module 60 and the sound module 70 are correctly controlled by the CPU 51.

In addition, upon the operating system being invoked, the CPU 51 starts initializing the entire system by reviewing each action and then by actuating the optical disk controller module 80 for performing a desired game program stored on an optical disk.

During execution of the game program, the CPU 51 actuates the graphic module 60 and the sound module 70 in response to command inputs by the operator for controlling display of images and reproduction of music or effect sounds. The representation of image data on the display by the image data processing apparatus of the present invention is next explained.

Figure 2:
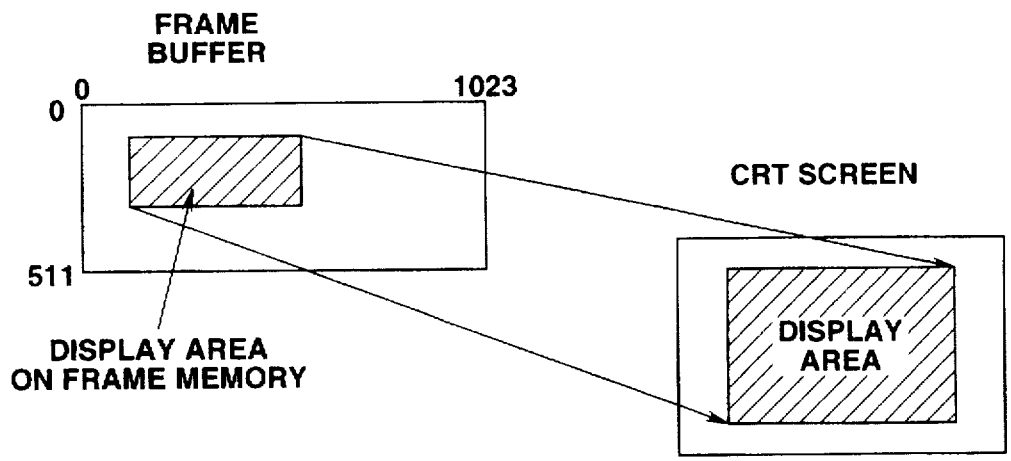
FIG. 2 is a diagram illustrating representation on a display.

The GPU 62 displays the area of a desired graphic model produced by the frame buffer 63 on the video output means 65 or display, e.g., such as a CRT. The area is referred to hereinafter as a display area. The relationship between the display area and the display screen is illustrated in FIG. 2.

The GPU 62 is designed to support ten different display modes which are shown below.

| Mode | Resolution | Remarks |
| --- | --- | --- |
| 0 | 256 (H) × 240 (V) | Non-interlaced |
| 1 | 320 (H) × 240 (V) | Non-interlaced |
| 2 | 512 (H) × 240 (V) | Non-interlaced |
| 3 | 640 (H) × 240 (V) | Non-interlaced |
| 4 | 256 (H) × 480 (V) | Interlaced |
| 5 | 320 (H) × 480 (V) | Interlaced |
| 6 | 512 (H) × 480 (V) | Interlaced |
| 7 | 640 (H) × 480 (V) | Interlaced |
| 8 | 384 (H) × 240 (V) | Non-interlaced |
| 9 | 384 (H) × 480 (V) | Interlaced |

Figure 3:
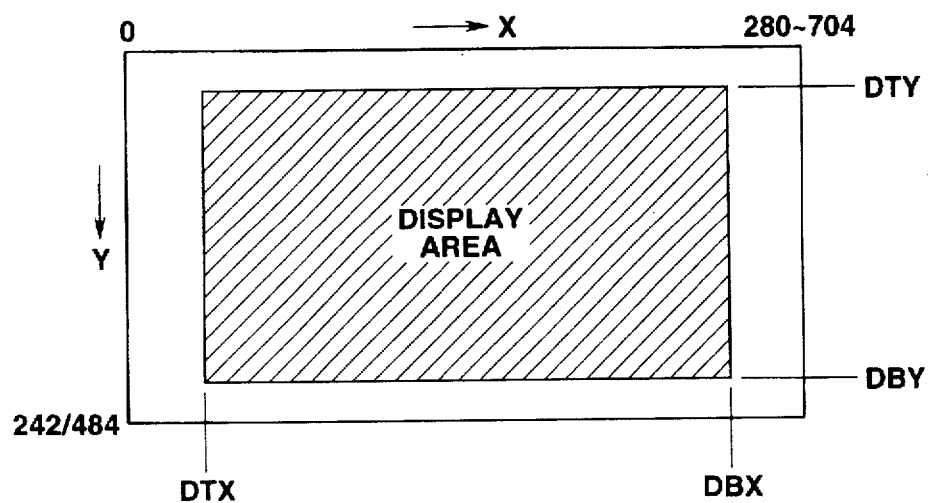
FIG. 3 is a diagram showing setting of representation on a display.

The size or the number of pixels of the display screen is variable and both the locations of display starting and end (expressed by (DTX,DTY) and (DBX,DBY) respectively on a coordinate plane) can separately be determined in the horizontal direction and the vertical direction respectively, as shown in FIG. 3.

The relation between a range of applicable values in the coordinate and the display mode is shown below. It is noted that DTX and DBX are multiples of 4. Hence, the minimum screen size consists of 4 pixels in horizontal by 2 pixels in vertical (in a noninterlaced mode) or 4 pixels (in an interlaced mode).

*The range of applicable values along the X axis:

| Mode | DTX | DBX |
| --- | --- | --- |
| 0 and 4 | 0 to 276 | 4 to 280 |
| 1 and 5 | 0 to 348 | 4 to 352 |
| 2 and 6 | 0 to 556 | 4 to 560 |

-continued

| Mode | DTX | DBX |
| --- | --- | --- |
| 3 and 7 | 0 to 700 | 4 to 704 |
| 8 and 9 | 0 to 396 | 4 to 400 |

*The range of applicable values along the Y axis:

| Mode | DTY | DBY |
| --- | --- | --- |
| 0 to 3 and 8 | 0 to 241 | 4 to 243 |
| 4 to 7 and 9 | 0 to 480 | 4 to 484 |

Furthermore, the GPU 62 supports two display color modes, 16-bit direct mode (32768 colors) and 24-bit direct mode (full color). The 16-bit direct mode (referred to hereinafter as a 16-bit mode) offers 32768 colors. Although it is limited to the number of displayable colors as compared with the 24-bit direct mode (referred to hereinafter as a 24-bit mode), the 16-bit mode allows color calculations of the GPU 62 to be carried out in 24-bit mode, and also has a dithering function which simulates a quasi-full-color (24-bit color) display. The 24-bit mode offers 16,777,216 colors (full color) and provides a bit-mapped display of image data transferred to the frame buffer 63, but fails to actuate any drawing action by the GPU 62. While the bit length of a pixel comprises 24 bits, the coordinate and location values on the frame buffer 63 have to be determined on the basis of 16-bit format. For example, 24-bit image data of 640×480 is treated as 960×480 in the frame buffer 63. Also, DBX is expressed by a multiple of 8. Accordingly, the minimum display size in the 24-bit mode is 8 pixels in horizontal by 2 pixels in vertical.

The drawing functions of the GPU 62 are next described.

The drawing functions include:

sprite drawing for generating sprites (e.g., a polygon) ranging from 1×1 dots to 256×256 dots in a 4-bit CLUT mode (4-bit format with 16 colors per sprite), 8-bit CLUT mode (8-bit format with 256 colors per sprite), and 16-bit CLUT mode (16-bit format with 32768 colors per sprite);

polygon drawing for executing drawing of a polygon (triangle, quadrilateral, and the like) of which each vertex is defined by coordinate values and then, performing flat shading for filling the polygon with a single color, Gouraud shading for providing a graduation on the polygon by assigning a different color to each vertex, and texture mapping for applying (a texture pattern of) two-dimensional image data onto the surface of the polygon;

line drawing in which gradation is applicable; and image data transfer for transferring image data from the CPU 51 to the frame buffer 63, from the frame buffer 63 to the CPU 51, and from the frame buffer 63 to the same.

Another function may be added, such as semitransparent rendering, wherein pixels are averaged (also known as alpha blending because data of pixels are combined together at a desired or alpha ratio), dithering for smoothing the interface of colors with the use of noise, clipping for eliminating features outside of the drawing area, or offsetting, in which the origin of the drawing is shifted depending on the drawing area.

Figure 4:
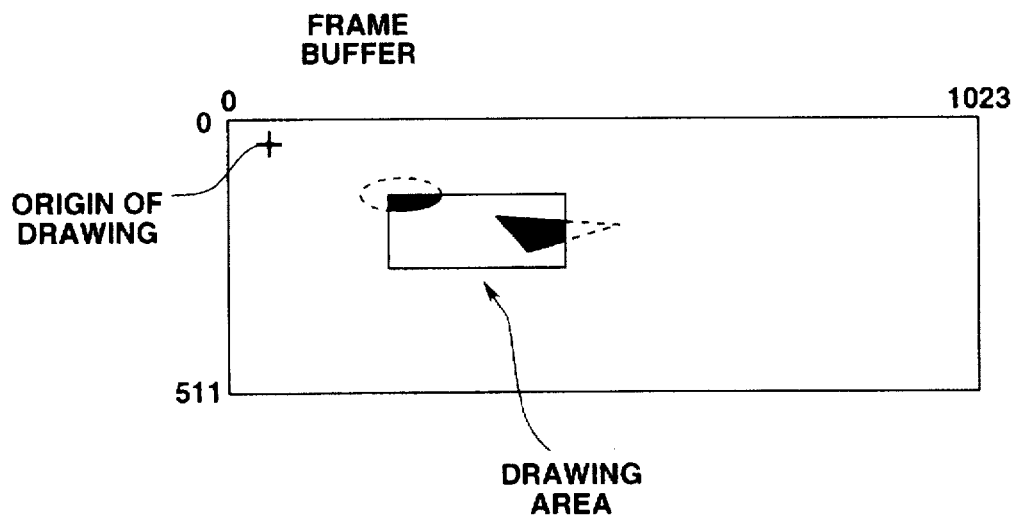
FIG. 4 is a diagram illustrating the clipping function for drawing.

The coordinate system on which a graphic is drawn is based on an 11-bit format, thus assigning each value of X and Y to a range of −1024 to +1023. As shown in FIG. 4, the size of the frame buffer 63 is 1024×512 and any extension may be folded. The origin of a drawing can arbitrarily be determined within the frame buffer 63 by controlling offset values of the coordinates. Because of the clipping function, the drawing is applicable to any shape only within the frame buffer 63.

As the sprite supported by the GPU 62 represents 256× 256 dots at the maximum, its horizontal and vertical lengths can freely be determined within that range.

Figure 5:
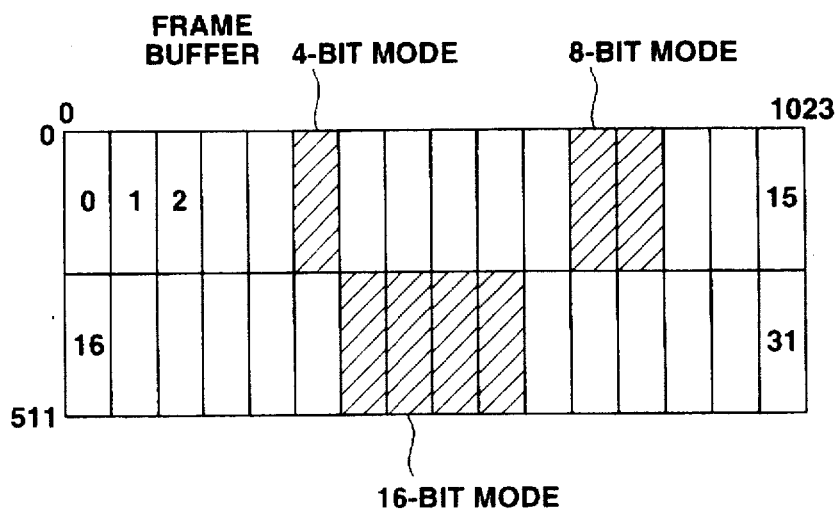
FIG. 5 is a diagram illustrating a texture page.

Image data (of a sprite pattern) to be attached to the sprite is allocated to a non-display area of the frame buffer 63 as shown in FIG. 5. Hence, the sprite pattern is transmitted to the frame buffer 63 before starting the command of drawing. A number of the sprite patterns may be preserved in the form of page units of 256×256 pixels so long as memory areas of the frame buffer 63 are available. The 256×256 pixel size is called a texture page. The location of each texture page is determined by assigning a page number to the parameter of a drawing command termed TSB for specifying the (address) point of texture page.

The sprite pattern is classified into three types of the color mode, 4-bit CLUT mode, 8-bit CLUT mode, and 16-bit CLUT mode. The 4-bit and 8-bit CLUT modes employ a CLUT.

Figure 6:
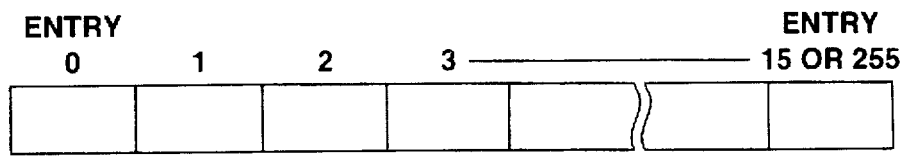
FIG. 6 is a diagram showing the structure of a CLUT.

The CLUT is shown in FIG. 6 where 16 to 256 of R, G, and B values of the three primary colors for creating visible colors to be displayed are aligned on the frame buffer 63. The R, G, and B values are numbered up in a sequence from the left end of the frame buffer 63 and the color of a pixel in the sprite pattern is identified by the number. The CLUT can be selected for every sprite and the sprites may be associated with their respective CLUTs. In FIG. 6, each entry represents a single pixel of the 16-bit mode and each CLUT is equal to 1×16 bits (in the 4-bit mode) or 1×255 bits (in the 8-bit mode) of the image data. The location of storage of the CLUT in the frame buffer 63 is determined by assigning coordinate values at the left end of the CLUT to be used to the parameter of a drawing command termed CBA for specifying the (address) point of CLUT.

Figure 7:
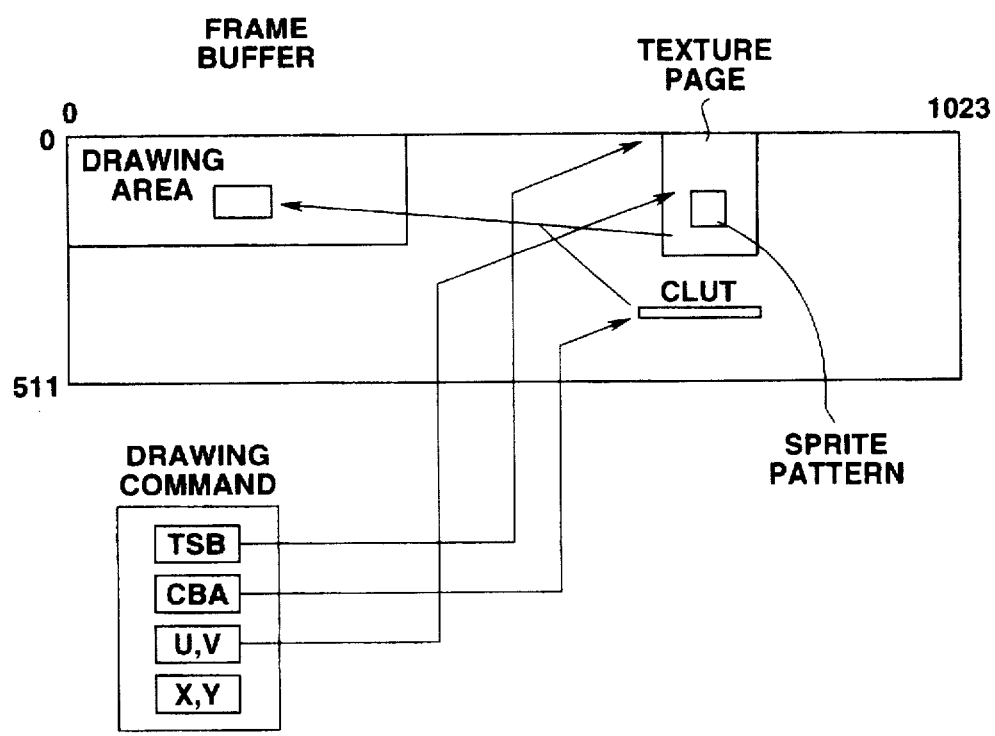
FIG. 7 is a diagram illustrating the fundamentals of drawing a sprite.

The drawing of a sprite is schematically shown in FIG. 7, in which U and V of the drawing commands are parameters for specifying the location in a texture page as expressed in a horizontal direction and a vertical direction respectively. Also, X and Y are parameters for specifying the location of a drawing area.

Figures 8, 9, 10:
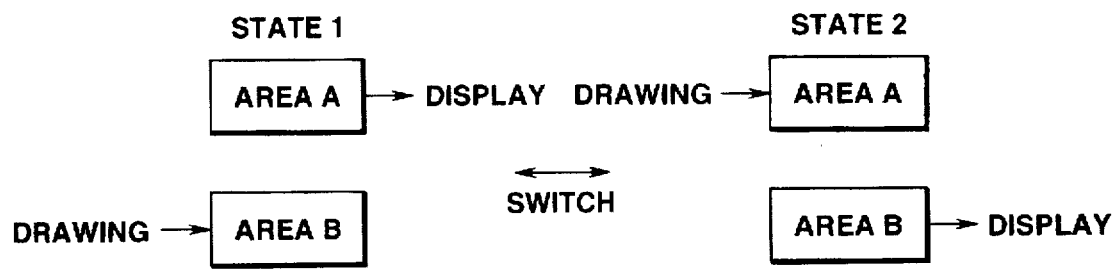
FIG. 8 is a diagram illustrating frame double buffering.
FIG. 9 is a diagram showing a command form of the drawing instruction.
FIG. 10 is a diagram showing assignment of coordinate offsets in the command form shown in FIG. 9.

The GPU 62 employs a motion display technique known as frame double buffering in which, as shown in FIG. 8, two quadrilateral patterns are prepared on the frame buffer 62; one is displayed while a graphic is being mapped in the other. When the drawing has been completed, the two patterns are switched over. This allows the display of rewriting action to be avoided. The switching over on the frame buffer 63 may be carried out during the vertical interval. Also, as the shape and origin of coordinates of a graphic to be drawn are arbitrarily determined in the GPU 62, they can be utilized with movements for appointing a plurality of the buffers.

A data format handled with the prescribed image processing apparatus of the present invention is next described.

During the texture mapping and the Gouraud shading, the CPU 51 in the image processing system delivers a set of instructions. The description starts with drawing instruction.

Command (1) or an example of the drawing instruction from the CPU 51 is illustrated in FIG. 9. In FIG. 9, R, G, and B represent luminance values common to the vertices of a polygon, and X and Yn are two-dimensional coordinates on a drawing plane of the vertex n. When an area defined by (X0,Y0)-(X1,Y1)-(X2,Y2) is filled with the luminances R, G, and B, command (1) is turned to a state shown in FIG. 10 where the coordinate offset values are shifted to (OFX, OFY).

Another command (2) is provided in which a tag including the number of words and the pointer to a succeeding command is added to command (1), as shown in FIG. 11. SIZE in FIG. 11 is a command length (4 in this example) and ADDR is a header address of the succeeding command. This tag allows a plurality of commands allocated not continuously on the frame buffer 63 to be executed at once. At that time, transfer of the drawing instruction will be performed by a specific hardware, but not the CPU 51. Similarly, when the area defined by (X0,Y0)-(X1,Y1)-(X2,Y2) is filled with the luminances R, G, and B, command (2) is turned to a state shown in FIG. 12 where the coordinate offset values will be varied.

The data format of the set of instructions is next described in greater detail.

A train of commands delivered from the host CPU 51 are implemented by the GPU 62 using the following symbols.

| | |
|---|---|
| CODE | command code and options. |
| R,G,B | luminances common to all vertices. |
| Rn,Gn,Bn | luminances at vertex n. |
| Xn,Yn | two-dimensional coordinates on plane of n. |
| Un,Vn | two-dimensional coordinates of plane of texture source corresponding to vertex n. |
| CBA | header address of CLUT (CLUT BASE ADDRESS) |
| TSB | (TEXTURE header address of texture page and SOURCE BASE) additional data such as texture type. |

Each of Xn and Yn in the command contains 16 30 bits in which the lower 11 bits are only eligible. The bit assignments of CBA and TSB are shown in FIGS. 13 and 14, respectively.

CLX in FIG. 13 is a header address (6 bits) of x-axis of CLUT and CLY is a header address (9 bits) of y-axis of the same. TSB shown in FIG. 14 has a bit assignment identical to the lower bits of MODE command (which will be explained later in more details). TPF in FIG. 14 represents the pixel depth of a texture pattern; 00 indicates the 4-bit mode (CLUT), 01 is the 8-bit mode (CLUT), and 10 is the 16-bit mode (CLUT). ABR of FIG. 14 is a semitransparency rate; 00 represents 0.50×F+0.50×B, 01 is 1.00×F+1.00×B, 10 is 0.50×F+1.00×B, and 11 is 0.25×F+1.00×B (where F is a foreground and B is a background). Also, in FIG. 14, TBX is a base address (upper 5 bits) along the x-axis in the texture pattern source space and TBY is a base address (upper 1 bit) along the y-axis in the same.

Figure 15:
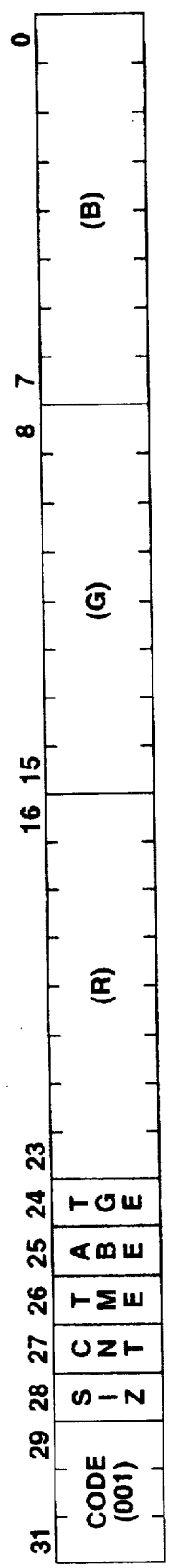
FIG. 15 is a diagram showing a format of a triangle drawing command.

Shown in FIG. 15 is a triangle drawing command (command code=1 h) where the command code (including option) is followed by command independent variables derived from vertex information. The number of the independent variables and their format are varied depending on the type option involved. When IIP in FIG. 15 is 0, a triangle shape is drawn (by flat shading) with the luminances R, G, and B of one type. When it is 1, the luminances of the three vertices are interpolated and used for Gouraud shading on the triangle shape. Also, when CNT is 0, three vertices following the command code create a triangle. When CNT is 1, four vertices following the command code generate two adjoining triangles (a quadrilateral shape). The texture mapping is switched off when TME is 0 and on when 1. Also, the semi-transparency processing is off when ABE is 0 and on when 1. TGE is eligible with 1 of TME and when it is 0, a mixture of the texture pattern and the luminance is displayed. When TGE is 1, the texture pattern only is exhibited. Their combination yields 23 different assignments as shown in FIG. 16.

Figure 17:
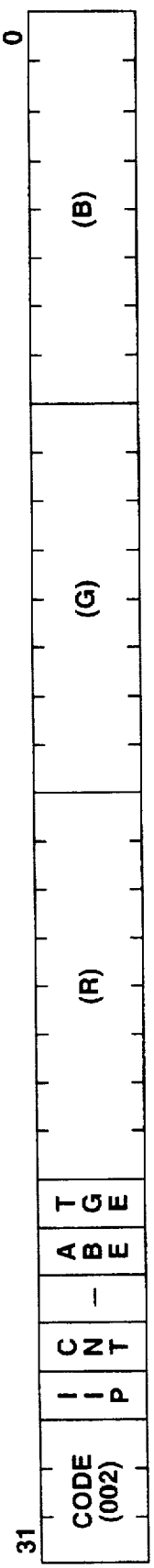
FIG. 17 is a diagram showing a format of a line drawing command.

FIG. 17 shows a line drawing command (command code=2 h) where a command code (including option) is followed by command independent variables of starting and end points data. The number and format are varied depending on the type of option involved. When IIP in FIG. 17 is 0, pixels are loaded with the luminances predetermined and when it is 1, a line drawn through linear interpolation of the luminances of two vertices with a change of the line along the longitudinal axis. Also, when CNT is 0, a line is drawn between two end points following the command code and when 1, a succession of lines are drawn. Similarly, when ABE is 0, the semitransparency processing is inactivated and when 1, it is activated.

Figure 18:
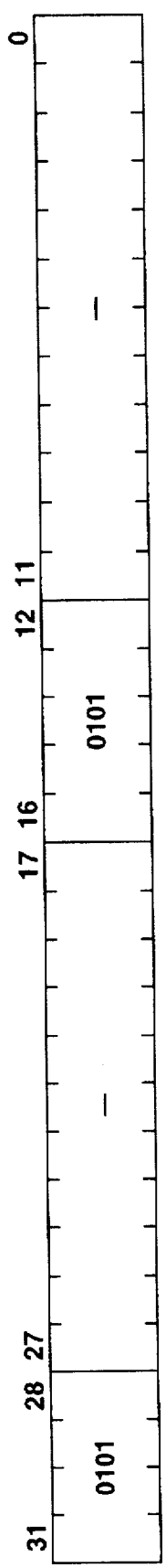
FIG. 18 is a diagram showing a format of a termination code required for drawing a succession of lines.

For drawing a succession of lines, a termination code (TERMINATION CODE) indicative of the end of a command is needed. The termination code format is shown in FIG. 18 and its assignments are shown in FIG. 19. As the lower 11 bits of Xn or Yn are only eligible, the coordinate value will rarely collide with the termination code in normal applications.

Figure 20:
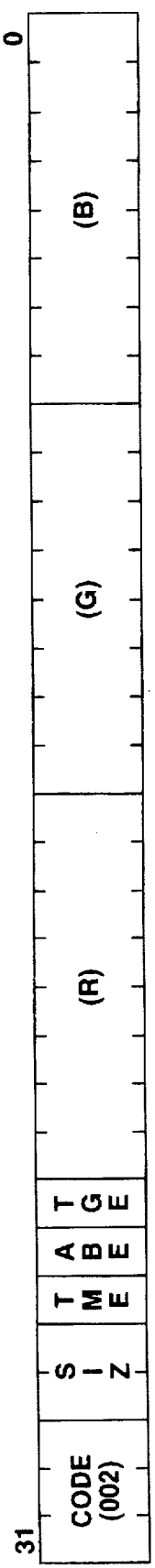
FIG. 20 is a diagram showing a format of a sprite drawing command.

FIG. 20 illustrates a sprite drawing command (command code=3 h) and FIG. 21 shows its assignments. In the sprite drawing command, a command code (including option) is followed by command independent variables of luminances, lower left end point of a rectangular shape, upper left end point in the texture source space, and width and height of the rectangular shape. The number of the independent variables and their format are varied depending on the type of option involved. It should be noted that Un is always an even number (with the lower one bit being neglected) because two pixels are processed simultaneously with the sprite command. The texture mapping is switched off when TME in FIG. 20 is 0 and on when 1. Also, the semitransparency processing is off when ABE is 0 and on when it is 1. TGE is eligible with 1 of TME and when it is 0, the texture pattern associated with the luminances is displayed. When TGE is 1, only the texture pattern is exhibited. SIZ is used to determine the size of the rectangular shape. When SIZ is 00, the size is determined by H. When it is 01, 10, and 11, the size is 1×1, 8×8, and 16×16 respectively.

Figure 22:
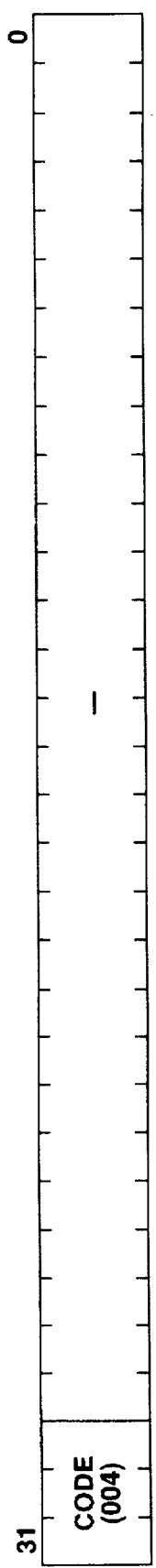
FIG. 22 is a diagram showing a format of a local-to-local transfer command.

Shown in FIG. 22 is a local-to-local transfer command (command code=4 h) which serves as a transfer command for transferring a rectangular data to and from the frame buffer. Its assignments are shown in FIG. 23. The rectangular data transfer command starts with a command code (including option) followed by command independent variables of upper left end point of a source rectangle area, upper left end point of a destination rectangle area, and width and height of the rectangle areas. CODE represents a command code and its option. SX and Sy are coordinates of the upper left end point of the source rectangle area (at transmitter), and DX and DY are coordinates of the upper left end point of the destination rectangle area (at receiver). W and H are a width and a height of the rectangle area, respectively.

Figure 24:
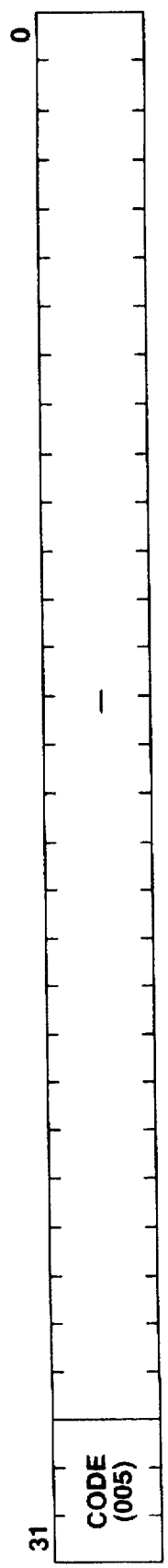
FIG. 24 is a diagram showing a format of a host-to-local transfer command.

FIG. 24 shows a host-to-local transfer command (command code=5 h) and its assignment is illustrated in FIG. 25. This is a transfer command for transferring data from the CPU to the frame buffer. Its command code (including option) is followed by command independent variables of the upper left end point of a destination rectangle area, width and height of the rectangle area, and transfer information. CODE represents a command code and its option. DX and DY are coordinates of the upper left end point of the destination rectangle area (at receiver). W and H are a width and a height of the rectangle area, respectively. Also, FRAM 0 to FRAM n are the transfer information.

Figure 26:
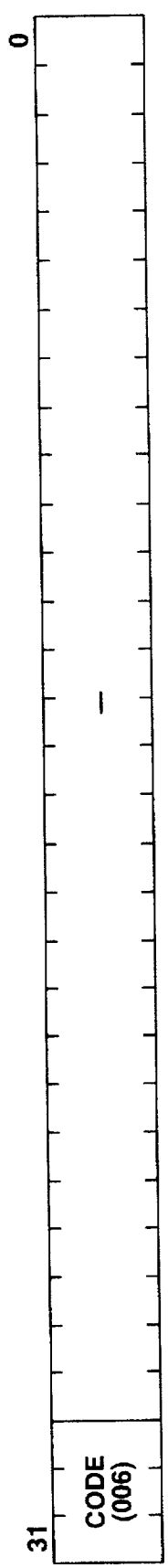
FIG. 26 is a diagram showing a format of a local-to-host transfer command.

FIG. 26 shows a local-to-host transfer command (command code=6 h) and its assignment is illustrated in FIG. 27. This is a transfer command for transferring data from the frame buffer to the CPU. It contains command independent variables of upper left end point of a source rectangle area, and width and height of the rectangle area. CODE represents a command code and its option. SX and SY are coordinates of the upper left end point of the source rectangle area (at transmitter). W and H are a width and a height of the rectangle area respectively. Any (parameter leading) command which occupies common ports cannot be executed during the local-to-host transfer action.

Figure 28:
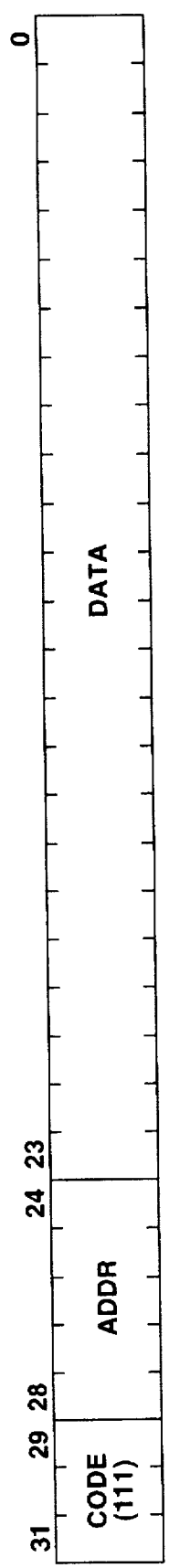
FIG. 28 is a diagram showing a format of a setting command.

FIG. 28 illustrates a setting command (command code=7 h) for setting of various parameter registers. It contains a command code (including address) and setting data. CODE represents the command code and its option. ADDR is an address and DATA includes setting parameters.

Figure 29:
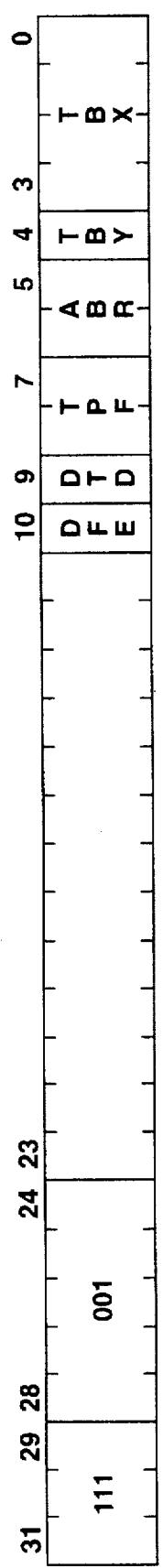
FIG. 29 is a diagram showing a format of a mode setting command.

A mode setting form (MODE) of the setting command (with address=1 h) is shown in FIG. 29 where TPF represents the pixel depth of a texture pattern. When TPF is 00, 01, AND 10, the texture pattern is the 4-bit mode (CLUT), THE 8-bit mode (CLUT), and 16-bit direct mode respectively. When DTD is 0, the dithering is not applied and when it is 1, dithering is applied. When DFT is 0, one of two fields not displayed is drawn during interlacing and when it is 1, the two fields are exhibited. ABR is a semitransparency rate; 00 represents 0.50×F+0.50×B, 01 is 1.00×F+1.00×B, 10 is 0.50×F+1.00×B, and 11 is 0.25×F+1.00×B (where F is a foreground and B is a background). Also, TBX is a base address (upper 4 bits) along the x-axis in the texture pattern source space and TBY is a base address (upper 1 bit) along the y-axis in the same.

Figure 30:
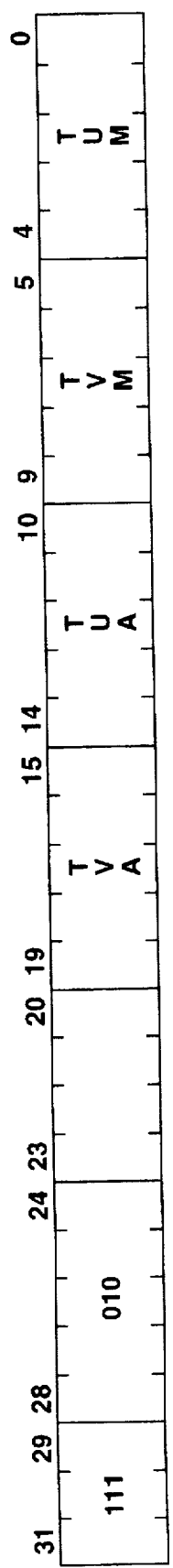
FIG. 30 is a diagram showing a format of a texture pattern repeat setting command.

In addition, a texture pattern repeat form (TEXTURE PATTERN REPEAT) of the setting command (with address=2 h) is shown in FIG. 30. TUM shown is a texture pattern U coordinate repeating mask, and TVM is a texture pattern V coordinate repeating mask. TUA is a texture pattern repeat U upper fixed address and TVA is a texture pattern repeat V upper fixed address.

Figure 31A:
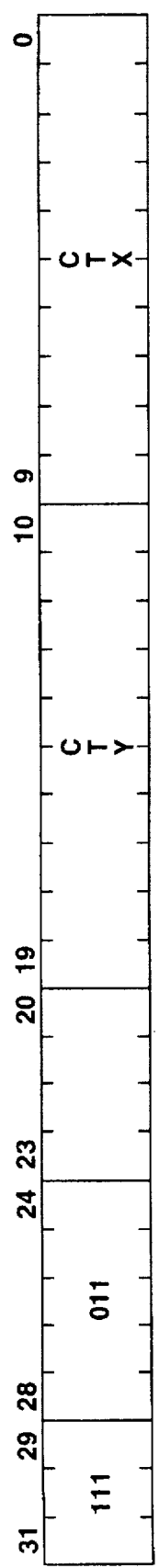
FIGS. 31(A–B) are diagrams showing a format of a clipping start and clipping end setting command.
Figure 31B:
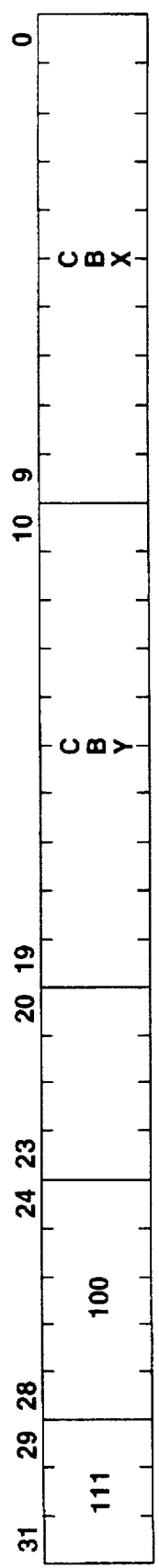

FIG. 31 illustrates a clipping start setting form (CLIPPING START) and a clipping end setting form (CLIPPING END of the setting command (with address=3 and=4 h respectively). More particularly, FIG. 31(a) is the clipping start setting command and FIG. 31(b) is the clipping end setting command. The clipping is operable with the polygon, line, and sprite drawing commands and not involved during the host-to-local and local-to-local transfer actions. CTX represents X address (10 bits) of the upper left end point of a clipping and CTY is Y address (9 bits) of the upper left end point of the clipping. Also, CBX is X address (10 bits) of the lower right end point of the clipping and CBY is Y address (9 bits) of the lower right end point of the clipping.

Figure 32:
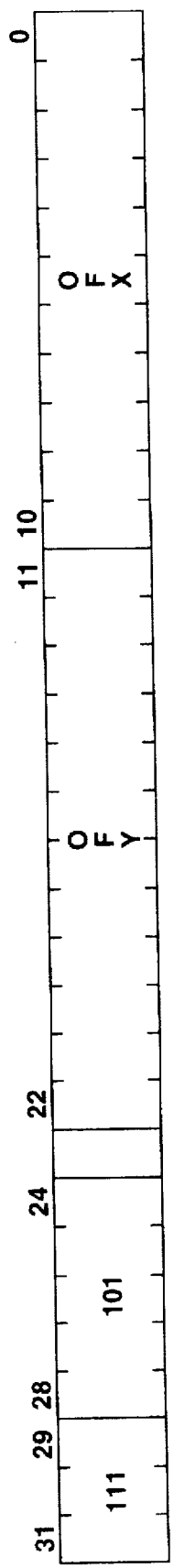
FIG. 32 is a diagram showing a format of an offset setting command.

A offset form (OFFSET) of the setting command (with address=5 h) is shown in FIG. 32 where OFX represents a coordinate offset value (X) (11 bits with a sign) and OFY is another coordinate offset value (Y) (11 bits with a sign).

Figure 33:
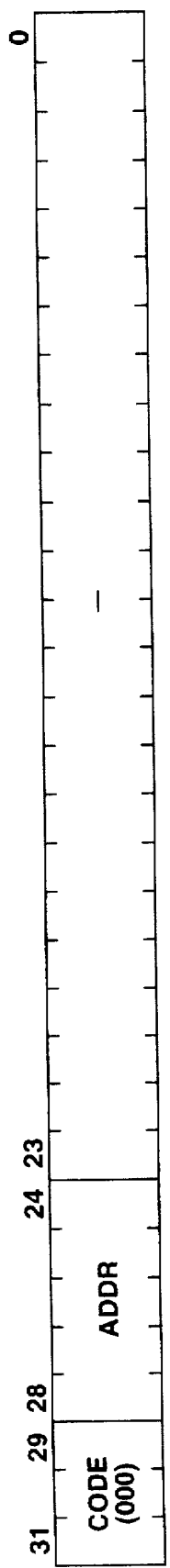
FIG. 33 is a diagram showing an illustrative format of a specific command.

FIG. 33 illustrates a specific command (with address=0 h) which is classified into an interrupt request enable command, an NOP or "No Operation" command (to be subsequently explained) as determined with its command code and option, and other commands.

Figure 34:
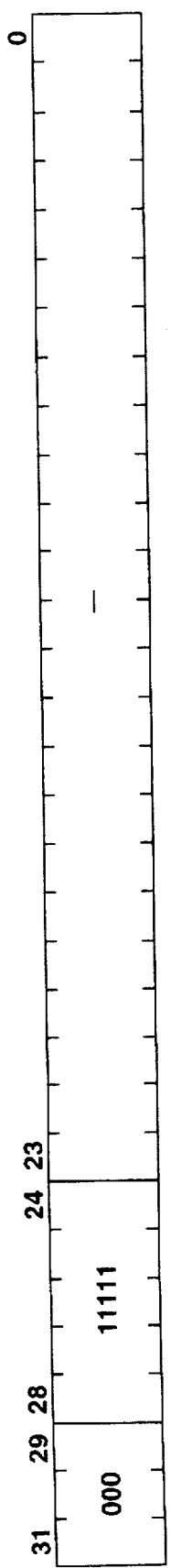
FIG. 34 is a diagram showing a format of an IRQ producing command.

The interrupt request command (IRQ) of the specific command is for assertion of IRQ pins as shown in FIG. 34.

Figure 35:
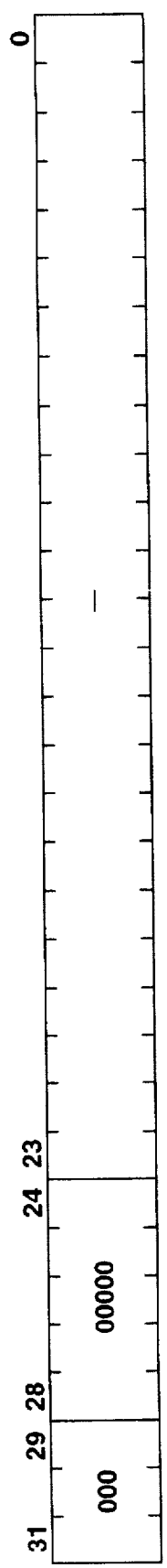
FIG. 35 is a diagram showing a format of an NOP command.

When the NOP (no operation) command shown in FIG. 35 is given, no action is performed.

Figure 36:
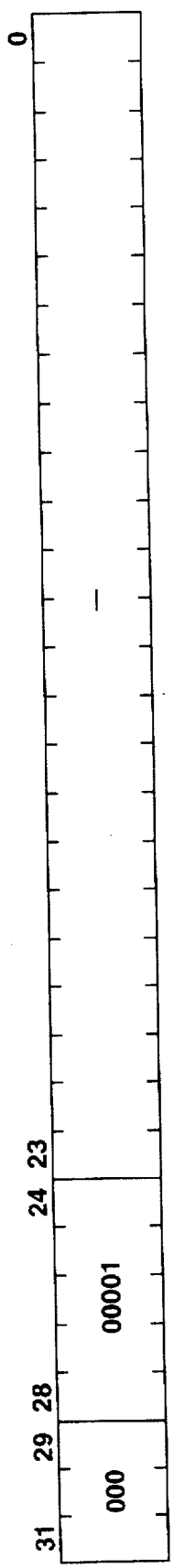
FIG. 36 is a diagram showing a format of a cache flash command.

A cache flash command of the specific command is for flashing contents of the texture cache and CLUT as shown in FIG. 36. It is noted that when the host-to-local or local-to-host transfer is carried out, the texture cache only is flashed automatically (while CLUT is preserved).

Figure 37:
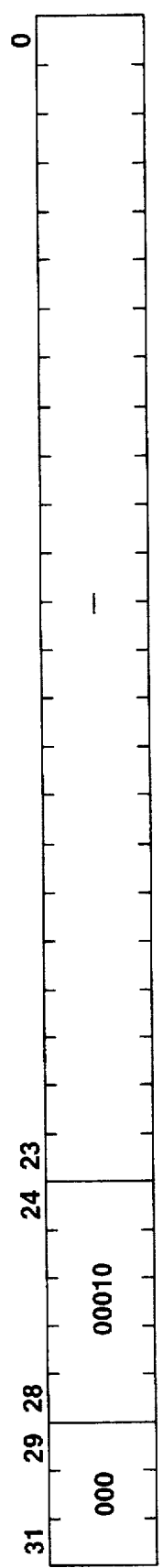
FIG. 37 is a diagram showing a format of a block write command.
Figure 38:
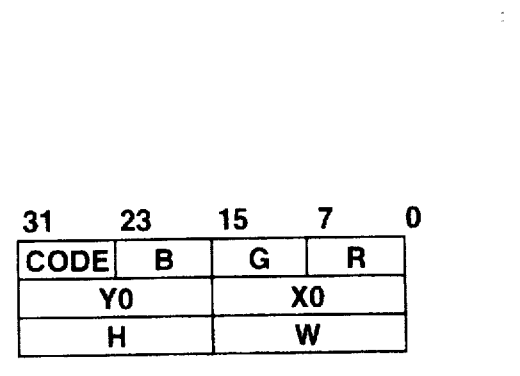

A block write command of the specific command is shown in FIG. 37 and its data assignment is shown in FIG. 38. This command is for initializing a rectangular shape at high speed. The size of the rectangular shape is determined by W and H. Each of R, G, and B contains 8 bits, but only the upper 4 bits are used for writing in a memory. Either the starting location (X0, Y0) or the size (H, V) of a rectangle area is expressed by an integer multiple of 32 pixels. Also, the lower 4 bits are not assigned.

The GPU 62 has a local memory which serves as a frame buffer for display of data and for areas of texture pattern and texture CLUT. The local memory is identical to the frame buffer 63 shown in FIG. 1.

The size of area defined by the GPU 62 for addressing to the frame buffer 63 is 0 to 1023 along the x-axis and 0 to 511 along the y-axis. The relation of one-dimensional address to the local memory (frame buffer 63) is thus expressed by:

One-dimensional address=$X_A+Y_A\times1024$.

In the 24-bit mode, the relation is:

One-dimensional address=$(3/2)\times X_A+Y_A\times1024$.

Since the page size in the frame buffer 63 is 1024×512 as fixed, $X_A$ represents a column address and $Y_A$ represents a row address. In the frame buffer 63, any area is available for drawing and can be displayed. However, the size for the display is determined by the particular mode. Also, $X_A$ and $Y_A$ in the frame buffer 63 are expressed by 10 bits and 9 bits, respectively with no use of signs. Each of coordinates x and y used in drawing a polygon is defined by 11 bits with a sign. In addition, a sum of coordinate (x,y) and offset (OFX,OFY) determined by the offset register is loaded as address data to the frame memory for drawing. No drawing is made outside of the frame memory size 1024×512.

Figure 39A:
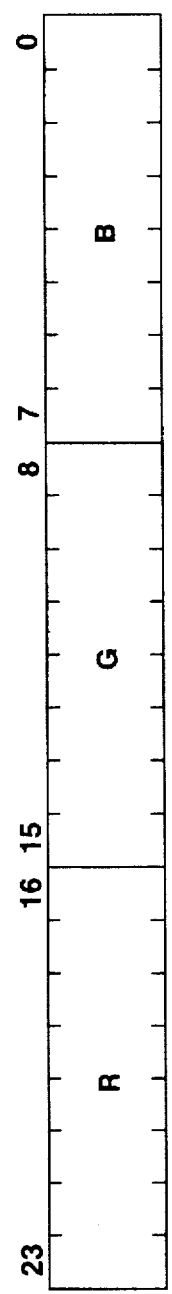
FIGS. 39(A–B) are diagrams of a pixel format.
Figure 39B:
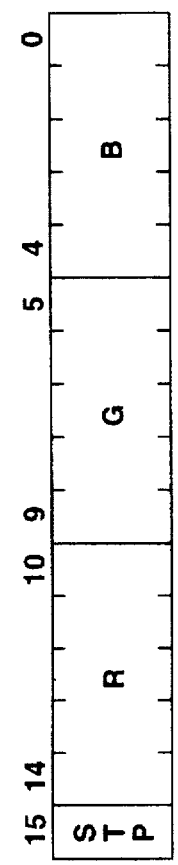

The pixel format will now be explained. The GPU 63 supports R:G:B=8:8:8 (bits) of the 24-bit mode shown in FIG. 39(a) and R:G:B=5:5:5 (bits) of the 16-bit mode shown in FIG. 39(b). The 24-bit mode is only for display, but not for drawing. In the figures, R is a red color component, G is a green color component, B is a blue color component, and STP is an overwrite flag. When STP is set to 1 in some modes, the content of a pixel will be preserved upon the pixel being overwritten. Accordingly, a preceding pattern of drawing can be recorded.

The format of the embodiment of the present invention allows the texture mapping to be carried out using a desired pattern from the texture page for drawing a polygon or sprite. This will be explained in more detail with regard to the coordinates (x,y) on the drawing plane and coordinates (u,v) on the texture page plane.

The area in the frame buffer where the texture patterns are stored is referred to as a texture page or texture page space. The pixel format of the texture patterns is classified into three modes of 4, 8, and 16 bits per pixel. The 4-bit and 8-bit modes create pseudo-colors while the 16-bit mode produces direct colors. These modes can be shifted from one to the other on the basis of a polygon. In each texture pattern, other than in the 16-bit mode, a number of pixels are packed into one word. Hence, the pixels in the texture pattern do not correspond one-to-one to the addresses in the frame buffer 63. Care should thus be taken to determine the address for loading a texture pattern to the frame buffer. The pixel formats for each of their respective modes are shown in FIG. 40.

Figure 40A:
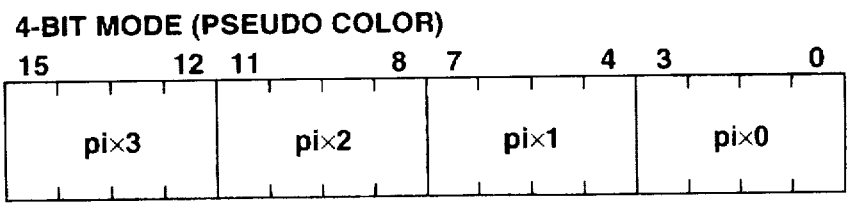
FIG. 40(A–C) are diagrams of a texture pattern format.
Figure 40B:
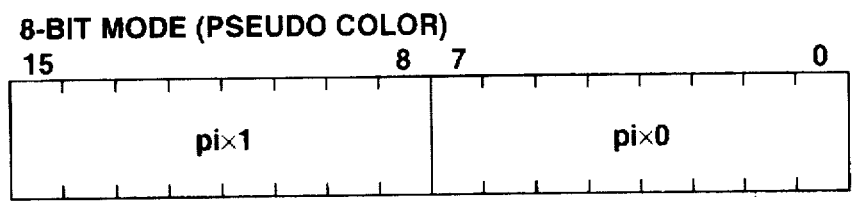
Figure 40C:
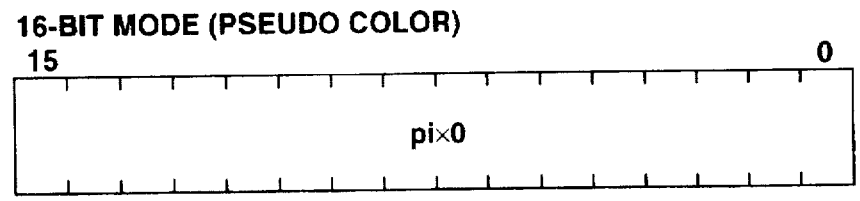

FIGS. 40(A) and 40(B) illustrate the modes of 4 bits per pixel and 8 bits per pixel, respectively. The pixel value represents not a real luminance but an index to CLUT. The pixels are thus converted to a 16-bit color format, shown in FIG. 41, using CLUT. As shown, R is a red color component, G is a green color component, B is a blue color component, and STP is a semitransparency flag.

Figure 41:
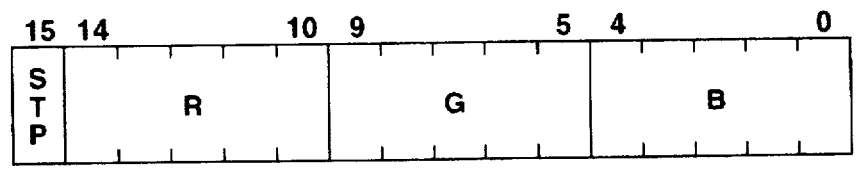
FIG. 41 is a diagram showing a 16-bit color format shifted by CLUT from a mode of 4 bits or 8 bits per pixel.
Figure 42:
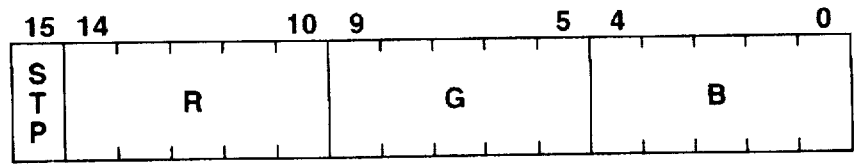
FIG. 42 is a diagram showing a format of a 16 bits per pixel mode.

The format of 16 bits per pixel employs no CLUT, but allows direct luminance values. This format has two different assignments as shown in FIGS. 41 and 42. Similarly, R is a red color component, G is a green color component, B is a blue color component, and STP is a semitransparency flag. When STP is 1, the pixel is rendered semitransparent. The semitransparency rate may be determined independently of the polygon.

The 4-bit and 8-bit mode formats determine the color (luminance) of a texture using the texture CLUT. Although more than one of the texture CLUTs may be allocated in the frame buffer, one drawing command permits one CLUT. The selection of CLUT is executed by specifying a header address in the frame buffer. The header address can be specified with CBA of the command independent variable.

The GPU 62 also has a texture CLUT cache which is examined before starting the polygon drawing process. The GPU 62 is loaded with a desired CLUT, if it is not already holding it. When the same CLUT is repeatedly used, the loading of a new CLUT is not required, thus maintaining high speed operation.

In accordance with the present invention, the texture coordinate data are minimized in word length and are provided with offsets so that the drawing instruction will be shortened. Also, a CLUT for the texture data is assigned for each polygon to be drawn, whereby the number of colors will be less limited even if pseudo-color textures are employed. It is unnecessary to prepare data for determining the semitransparency rate for each pixel due to assignment of the semitransparency rate to each polygon to be drawn. The dithering is turned on or off for each drawing process of a polygon, contributing to the freedom of graphic expression. Furthermore, both the texture and vertex coordinate values are determined at one time so that the color of a texture mapped polygon can readily be modified in hue without changing the texture pattern.

The semitransparency rate is not varied within a common range from 0 to 1, but rather is assigned to negative (minus) values, allowing the luminance of an existing pixel to be decreased. When the vertex coordinates of continuous vertices of a polygon to be drawn are determined, the number of the vertices is limited to three or four. This eliminates the need of termination codes and allows the vertices to be designated with the use of shortened drawing commands. In addition, the coordinate offsets for drawing are varied during the drawing instruction, permitting the ease of parallel movement of the object (a realistic model or subject to be drawn) on a display screen.

In addition, the present invention enables the semitransparency rendering to be turned on or off by the highest bit of a pixel when the image is treated as a texture pattern. This eliminates the need of a specific plane of alpha for determining the semitransparency rate. Also, when the image is used as a background, the inhibition or permission of overwriting is controlled with the highest bit of each pixel, thus allowing the nearest graphic to be first drawn. With the image treated as a texture pattern, any desired combination of color modes can be selected from the 4-bit, 8-bit, and 16-bit modes for yielding a mixture of direct color mode and pseudo-color mode. A desired texture type is also assigned corresponding to the properties of a texture image within the capability of the frame buffer.

As set forth above, the present invention provides production of the color specifying data for assigning a desired color data table to the texture image data for each polygon shape drawn on the two-dimensional display screen, thus eliminating the limitation of the number of colors used with application of pseudo-color texture.

Moreover, the mixture rate specifying data is produced for determining for each polygon shape a mixture rate in the semitransparency process at which pixel data of the current polygon shape drawn on the two-dimensional display screen is mixed with pixel data of a succeeding polygon shape to be drawn. This results in no need for data determining the mixture ratio at each pixel.

In accordance with the present invention, the dithering specifying data is produced for switching on and off the dithering action where each boundary between two colors is smoothed by noise for each polygon shape drawn on the two-dimensional display screen, thus contributing to the freedom of graphic representation.

Hence, the present invention satisfies the long existing need for enhanced image data processing having reduced word length and memory storage requirements, as well as a recording medium carrying such image data.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:

1. An image data reproducing apparatus comprising:
   (a) reading means for reading out first data representing a three-dimensional image of a polygon representing a character of the surface of each polygon from a data storage media;
   (b) means for converting said first data by perspective transformation into two-dimensional image data;
   (c) means for drawing a graphic image to graphic memory corresponding to said converted two-dimensional image data and a second data; and
   (d) means for providing the graphic image read out from said graphic memory to a display;
   wherein each said polygon displayed includes said second data.

2. An apparatus as set forth in claim 1, wherein said second data includes color data for specifying color information.

3. An apparatus as set forth in claim 1, wherein said second data includes texture data for specifying texture mapped on the surface of each of said polygon.

4. An apparatus as set forth in claim 1, wherein said second data includes semitransparency data.

5. An apparatus as set forth in claim 4, wherein said semitransparency data specifies a mixture rate with a succeeding polygon.

6. An apparatus as set forth in claim 4, wherein said semitransparency data designates one of a plurality of semitransparency modes.

7. A recording medium for use with an image data reproducing apparatus, said recording medium comprising:
   a storage media having recorded thereon data for:
   (a) a reader for reading out first data representing a three-dimensional image of a polygon and second data representing a character of the surface of each polygon;

(b) a converter for converting said first data by perspective transformation into two-dimensional image data;

(c) a drawing unit for drawing a graphic image to graphic memory corresponding to said converted two-dimensional image data and a second data; and (d) means for providing the graphic image read out from said graphic memory to a display; and wherein each said polygon displayed includes said second data.

8. A method for reproducing an image, comprising the steps of:

(a) reading out first data representing a three-dimensional image of a polygon and second data representing a character of the surface of each polygon from data storage media;

(b) converting said first data by perspective transformation into two-dimensional image data;

(c) drawing a graphic image to graphic memory corresponding to said converted two-dimensional image data and a second data;

(d) providing the graphic image read out from the graphic memory to a display;

wherein each said polygon includes said second data.

9. A method as set forth in claim 8, wherein said second data includes color data for specifying color information.

10. A method as set forth in claim 8, wherein said second data includes texture data for specifying texture mapped on the surface of each polygon.

11. A method as set forth in claim 8, wherein said second data includes semitransparency data.

12. A method as set forth in claim 11, wherein said semitransparency specifies a mixture rate with a succeeding polygon.

13. A method as set forth in claim 11, wherein said semitransparency data designates one of a plurality of semitransparency modes.

* * * * *

UNITED STATES PATENT AND TRADEMARK OFFICE
CERTIFICATE OF CORRECTION

PATENT NO. : 5,757,376
DATED : May 26, 1998
INVENTOR(S) : Masakazu Suzuoki, Makoto Furuhashi, Masayoshi Tanaka, Teiji Yutaka It is certified that error appears in the above-identified patent and that said Letters Patent is hereby corrected as shown below:

Column 5, line 39, change "391", to read --394--.

Signed and Sealed this

Sixteenth Day of March, 1999

*Attest:*

Q. TODD DICKINSON

*Attesting Officer*  *Acting Commissioner of Patents and Trademarks*